Patented Dec. 11, 1945

2,390,499

UNITED STATES PATENT OFFICE 2,390,499

PREPARATION OF CALCIUM PANTOTHENATE

Gustaf H. Carlson and Sidney R. Safir, Pearl River, N. Y., assignors to Lederle Laboratories, Inc., New York, N. Y., a corporation of Delaware No Drawing. Application January 17, 1942, Serial No. 427,178

4 Claims. (Cl. 260—534)

This invention relates to an improved method for the preparation of calcium pantothenate.

Calcium pantothenate has been prepared in the past by a number of methods, such as for example fusing calcium β-alanate with α-hydroxy-β,β-dimethyl-γ-butyrolactone, by reacting β-alanine with the lactone in aqueous calcium hydroxide, or by reacting β-alanine, calcium hydroxide, and the lactone in an aliphatic alcoholic medium. These previous or older methods employed for producing calcium pantothenate require rather elaborate purification steps and when the aqueous solutions are employed, it is necessary to carry out tedious evaporations and frequently prolonged desiccation of the difficultly dried salt. It is an object of the present invention to provide a method for preparing calcium pantothenate in good yields and under conditions which facilitate the recovery of a pure calcium pantothenate.

In accordance with the present invention we have discovered that calcium ammonium or calcium amide can be reacted with β-alanine under suitable conditions to produce calcium β-alanate, and in a further step reacted with α-hydroxy-β,β-dimethyl-γ-butyrolactone in an alcoholic medium to produce calcium pantothenate. In carrying out the reactions, the calcium ammonium or calcium amide is preferably reacted with β-alanine in an alcoholic medium under substantially anhydrous conditions and then adding the lactone to this solution results in the production of calcium pantothenate in a substantially anhydrous form. When desired, the β-alanine and α-hydroxy-β,β-dimethyl-γ-butyrolactone may first be mixed in the alcoholic medium and subsequently treated with calcium ammonium or calcium amide to result in the production of calcium pantothenate. Similarly, the calcium amide may be first added to an alcoholic solution of the lactone and this solution subsequently treated with β-alanine to result in the production of calcium pantothenate.

The calcium ammonium utilized in our invention can be produced by reacting metallic calcium with liquid ammonia and removal of the excess ammonia by distillation. The calcium ammonium thus produced can be used directly in the subsequent steps or it may be converted to the amide by heating and the calcium amide used in the subsequent steps. It is to be understood, therefore, that calcium ammonium or calcium amide may be used interchangeably in carrying out our invention. In general we prefer the method which comprises mixing calcium ammonium or calcium amide with β-alanine in an alcoholic medium and heating at relatively low temperature until solution is effected. Temperatures of from 75° to 100° C. are usually sufficient, the temperature being somewhat dependent upon the particular alcohol employed as the reaction medium. The α-hydroxy-β,β-dimethyl-γ-butyrolactone is then added to this alcoholic solution and a reaction takes place at room temperature resulting in the production of calcium pantothenate. If desired, this step may also be carried out at lower temperatures or temperatures up to about 100° C. may be employed. The calcium pantothenate thus produced can be recovered by direct crystallization, by evaporation of the alcohol, or by dilution of the alcoholic solution with ether, acetone, or the like, to cause precipitation. When the precipitation method is utilized for recovering the calcium pantothenate, it may be purified by crystallization from a suitable aliphatic alcohol, such as methyl or ethyl alcohol.

The invention will be described in greater detail in conjunction with the following specific example. It should be understood, however, that the example is given merely by the way of illustration and the invention is not to be limited to the details set forth therein.

Example 1

Calcium (1 g.) was dissolved in 30 cc. of liquid ammonia at −80° C., most of the ammonia was distilled and the residue was treated with 50 cc. of n-butanol. After most of the ammonia had distilled, the mixture was maintained at 80° C. for thirty minutes and, after addition of 4.45 g. of β-alanine, the mixture was heated another half hour. The insoluble materials were filtered off and the clear filtrate was treated with 6.5 g. of 1-α-hydroxy-β,β-dimethyl-γ-butyrolactone ($\alpha = -48.3°$). After three days, solvent was distilled in vacuo and the gummy residue was dissolved in 30 cc. of methanol. During forty-eight hours the solution deposited 2.6 g. of crystalline calcium pantothenate, m.p. 185–187° C. (uncorrected). Analysis calculated ($C_9H_{16}O_5N)_2Ca$: Ca, 8.41. Found: Ca, 9.30. In water solution the salt showed a rotation of $(\alpha) = +24.1°$ and was completely active in a bioassay with Lactobacillus casei E.

Similar results have been obtained employing other alcohols instead of n-butanol, and it is obvious that our invention may be carried out utilizing as the reaction medium any ordinary aliphatic, aromatic, or heterocyclic alcohol or any mixture of such alcohols. The aliphatic alcohols suitable for carrying out our invention include the normal and branched chain compounds, such as methanol, isopropyl alcohol, butanol, and the like. Similarly, the polyhydroxy aliphatic alcohols, such as ethylene glycol, glycerine, and propylene glycol may be employed. The ether alcohols, cellosolves, ethylene glycol monomethyl ether, the corresponding butyl ether, phenyl and benzyl ethers, are likewise satisfactory. The carbitols, diethylene glycol monomethyl ether, the corresponding butyl ether, and the like, may also be employed. The alicyclic compounds, cyclopentanol, cyclohexanol, fenchyl alcohol, menthyl alcohol, and the like, are satisfactory. The aromatic, arylaliphatic, and heterocyclic alcohols that may be employed include those such as benzyl alcohol, phenyl ethyl alcohol, naphthyl methyl alcohol, furfurol, tetrahydrofurfurol, and the like. The preferred alcohols for carrying out the process are the lower aliphatic alcohols such as methyl alcohol, n-butyl alcohol, and ethyl alcohol.

Similarly, it should be understood that the calcium pantothenate may be isolated by direct crystallization from the reaction medium by evaporation of the reaction medium or by precipitation from the reaction medium by dilution with various diluents. The preferred diluents for this operation are acetone, ether, and ethyl acetate.

The term "alcoholic medium" employed in the specification and claims includes any one of the alcohols mentioned above or mixtures thereof.

We claim:

1. A method for producing calcium pantothenate which comprises reacting a substance of the group consisting of calcium ammonium and calcium amide with $\beta$-alanine in an alcoholic medium and subsequently adding $\alpha$-hydroxy-$\beta,\beta$-dimethyl-$\gamma$-butyrolactone to the alcoholic medium.

2. The process which comprises reacting a substance of the group consisting of calcium ammonium and calcium amide with $\beta$-alanine in an alcoholic medium to give calcium $\beta$-alanate.

3. The process which comprises reacting a substance of the group consisting of calcium ammonium and calcium amide with $\beta$-alanine in an aliphatic alcoholic medium to give calcium $\beta$-alanate.

4. The process which comprises reacting a substance of the group consisting of calcium ammonium and calcium amide with $\beta$-alanine in n-butanol.

GUSTAF H. CARLSON.
SIDNEY R. SAFIR.